(No Model.) 2 Sheets—Sheet 2.
L. WAGNER & J. MARR.
ELECTROLYTIC CONDUIT FOR BEER OR OTHER LIQUIDS.
No. 535,267. Patented Mar. 5, 1895.
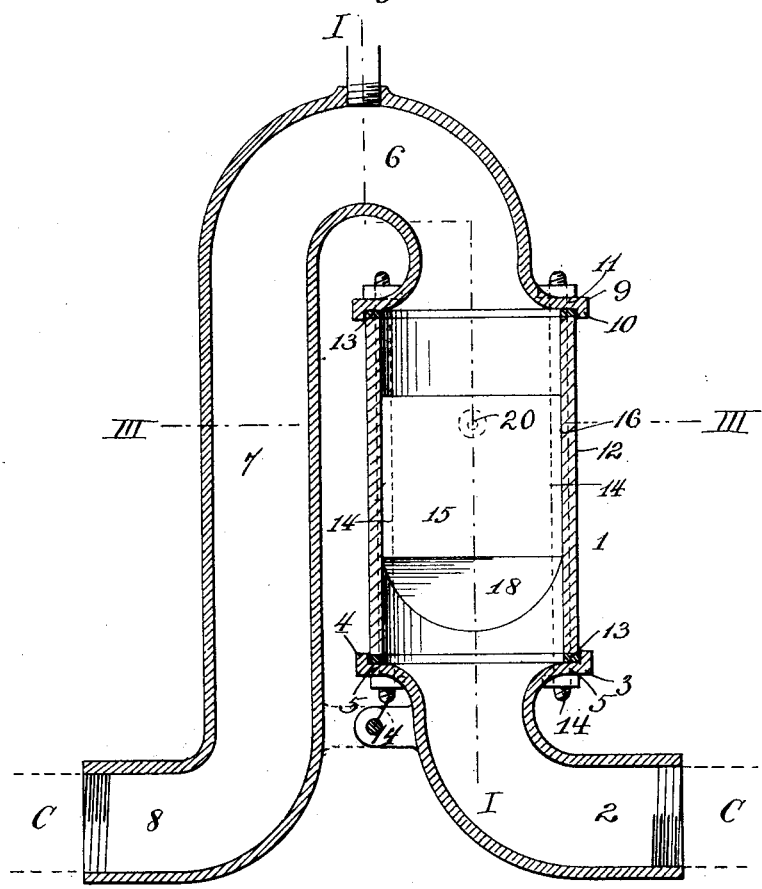
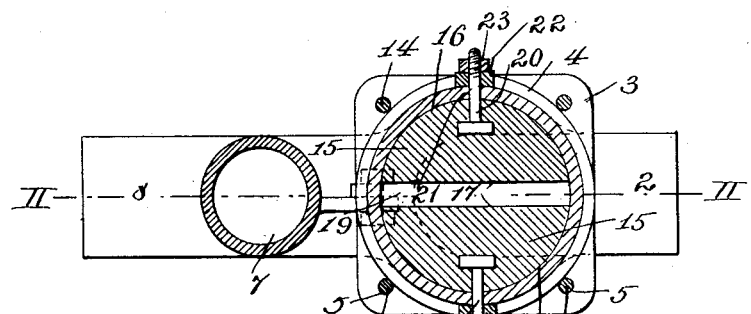

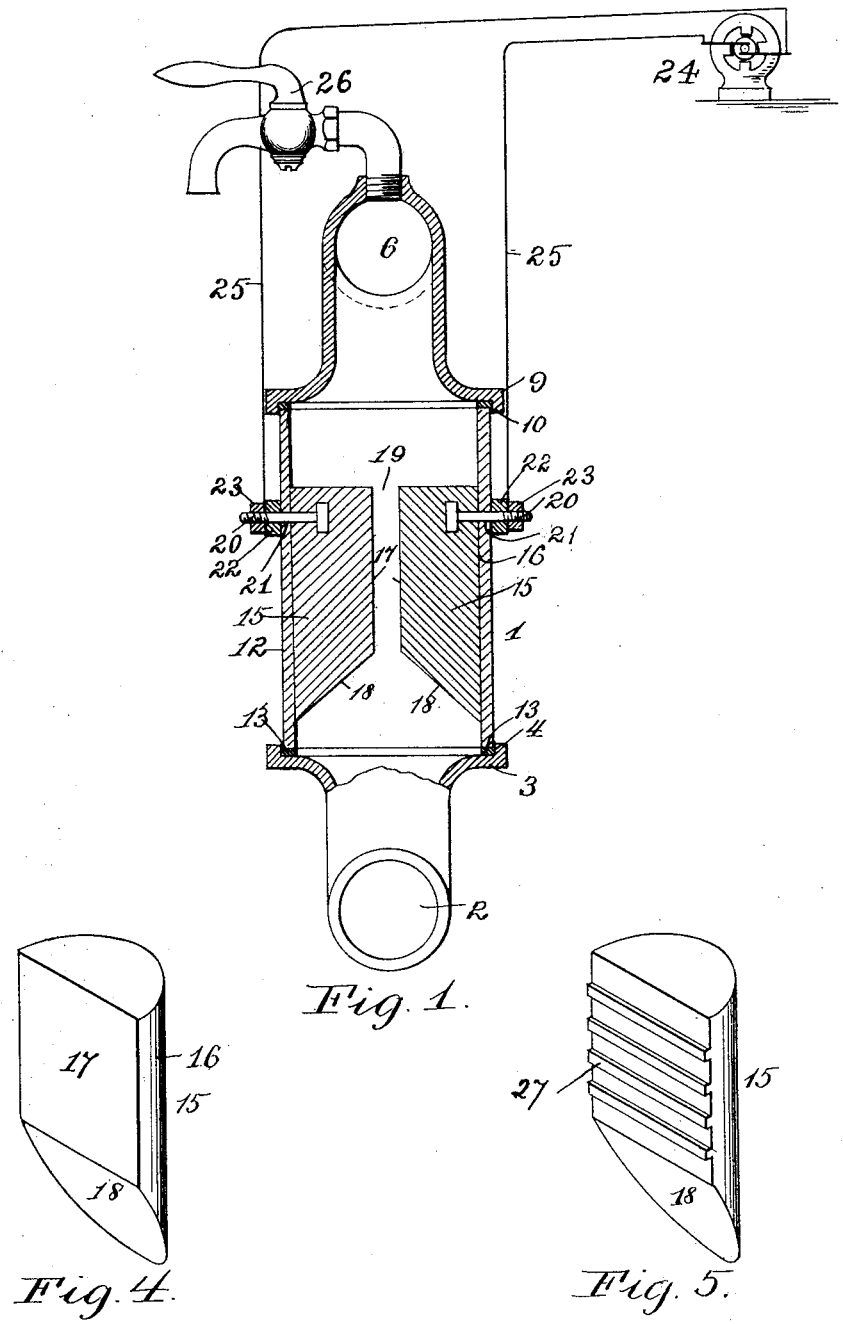

UNITED STATES PATENT OFFICE.

LOUIS WAGNER AND JOHN MARR, OF BALTIMORE, MARYLAND.

ELECTROLYTIC CONDUIT FOR BEER OR OTHER LIQUIDS.

SPECIFICATION forming part of Letters Patent No. 535,267, dated March 5, 1895.

Application filed November 12, 1894. Serial No. 528,562. (No model.)

*To all whom it may concern:*

Be it known that we, LOUIS WAGNER and JOHN MARR, citizens of the United States of America, residing at Baltimore, Maryland, have invented certain new and useful Improvements in Electrolytic Conduits for Beer or other Liquids, of which the following is a specification.

Our invention relates to that class of apparatus in or by which an electric current, preferably of an alternating character, may be applied to or through liquids for the purpose, among other things, of destroying the life of organisms which would otherwise cause the deterioration or souring of beer, or effect similar or other objectionable results in other liquids.

It is the object of our invention to effect these results in a more simple, effective and economical manner, and to such end consists in a conduit provided with opposing electrodes which limit the passage of liquid, or other material through the conduit and spread or disperse it in a comparatively thin sheet over their opposing surfaces.

It further consists in a conduit having opposing electrodes of peculiar shape as hereinafter set forth.

It further consists in a conduit which is at the same time a sight-glass or tube of transparent insulating material, provided interiorly with and supporting opposing electrodes.

It further consists in an electrolyzing device adapted to be interposed in a beer or other conduit.

It further consists in certain parts and combinations thereof hereinafter set forth and claimed.

In order to make our invention more clearly understood we have shown in the accompanying drawings means for carrying it into practical effect, without limiting our improvements, in their useful applications, to the particular construction which, for the sake of illustration, we have delineated.

In said drawings:—Figure 1 is a vertical sectional view, on line I—I, Fig. 3, of a conduit and electrodes embodying our invention. Fig. 2 is a similar view on line II—II, Fig. 3. Fig. 3 is a horizontal sectional view on line III—III, Fig. 2. Fig. 4 is a perspective of one of the electrodes in its preferred form. Fig. 5 is a similar view of another form of electrode.

Referring to the drawings 1 is a conduit which may be the draw-off pipe for the fine beer from the shavings-cask, the pipe leading from the fermenting vat, or a conduit from any desired source of supply of the liquid to be treated. The lower portion of this conduit is preferably an elbow 2 provided at its upper end with a horizontal flange 3, with a vertical collar or flange 4, and within the latter with a shoulder 5.

6 is a continuation of the conduit 1, in the form of a goose-neck, the limb 7 of which returns downward parallel with the ascending limb of the conduit, and terminates in an elbow 8 in line with the elbow 2. The device may then be conveniently interposed in any existing conduit, as C, without displacing or diverting the latter. The elbow is formed with a flange 9, collar 10, and shoulder 11, similar to those of the part 2.

Interposed and held between the shoulders 5 and 11 and having its ends within the collars 4 and 10, is a sight-tube or section 12 composed in whole or in part of suitable material such as glass, so that the liquid passing through the conduit, and any electrolyzing action upon it, may be here observed. The upper and lower ends of the tube 12 rest upon rubber or other packing rings 13, and the parts 2 and 6 are firmly clamped upon it by bolts 14 parallel with the tube and passing through the flanges 3 and 9.

The electrodes, of carbon or other suitable conducting material, are indicated at 15 and are mounted within and insulated by the tube 12. They, in conjunction with the tube or with any filling or obstructing material which may be employed, restrict the free passageway through the tube to a relatively narrow opening or slit 19 which is situated directly between the electrodes, whereby their operative faces, from one to the other of which the electric current passes, are brought close together and the liquid spread and dispersed so as to have all of its parts and organisms therein, efficiently treated. To this end we prefer to form the electrodes as shown, with semi-cylindrical rear faces 16 fitting closely to the wall of the tube 12, with flat opposing operative or conducting faces 17 and with inclined bottom faces 18 whereby the liquid is directed to the narrow free passage 19. Secured in or to, or formed with the electrode is a conductor 20 which passes through the tube 12 by an aperture 21.

22 is a washer at the outside of said aperture through which also the conductor 20 passes, and 23 is a nut screwed upon the end of the conductor and clamping the electrode in place.

The source of electrical energy is indicated diagrammatically at 24 from the opposite poles of which conductors 25 lead respectively to the two electrodes, and may be conveniently connected thereto by being clamped beneath the nuts 23.

Such being the arrangement of the parts it will be observed that the fluid, for instance beer from the shavings-cask, coming along the conduit C will be caused to pass into the elbow 2. Its course being thence upward as it passes the electrodes, it is caused by gravity to fill all parts of the tube 12 so that all the operative faces of both electrodes are encountered by the liquid (which would not necessarily be the case if the tube 12 lay horizontally and the flow of liquid were not sufficient to fill the conduit). The liquid being spread into a thin body or sheet by the restricting action of the surfaces 18, all particles in it are brought into contact with or in close proximity to the operative faces 17 and caused to furnish a part of the conducting means for the electric current from one such surface to the other, whereby any organisms are killed or rendered harmless. By mounting the electrodes entirely in a tube or chamber of non-conducting material, the electrical energy is not dissipated but caused to act through the electrodes alone and on the thin sheet of liquid between them.

26 is a sampling and vent cock in the conduit, and preferably situated at the extreme top of the bend 6. It serves to deliver a sample of the electrically treated liquid. In case the electrolytic action is sufficiently strong to decompose into gas any constituents of the liquid, such gas will collect in the bend 6, and may be suffered to escape through the cock 26 at intervals or as it collects, thus preventing its accumulation from interfering with the free passage of the liquid.

In order to cause all parts of the passing liquid to make contact with or come nearer to the electrodes, the opposing surfaces 17 of one or both of the latter may be transversely ribbed or corrugated so that the liquid next to said surfaces will be retarded, causing the liquid to roll over said surfaces and bring particles and organisms from the middle of the passage 19 into contact with the electrodes. Such corrugation is indicated at 27 in Fig. 5.

The electrodes may be solid, or of other suitable construction.

The device or apparatus may be situated at any suitable point in a beer making plant, and may be the means of finally drawing off the finished beer.

We claim—

1. In an apparatus for the electrical treatment of beer or other liquid, a conduit-section composed of glass, serving as a sight-tube and adapted to be interposed in a conduit, and opposing electrodes supported within and substantially midway the length of said conduit-section leaving a central narrow space between them for the passage of the liquid, as set forth.

2. In an apparatus for the electrical treatment of beer or other liquid, a conduit-section composed of glass, serving as a sight-tube and adapted to be interposed in a conduit, and opposing electrodes supported within and substantially midway the length of said conduit-section with their adjacent faces substantially parallel leaving a central narrow space between them extending diametrically across the conduit to expose said space to view, as set forth.

3. In an apparatus for the electrical treatment of beer or other liquid, a tubular conduit section composed of non-conducting material and adapted to be interposed in a conduit, and opposing electrodes, each of semi-cylindrical form and supported within and substantially midway of the length of said conduit-section with their adjacent faces substantially parallel leaving a central narrow space between them for the passage of the liquid, as set forth.

4. In an apparatus for the electrical treatment of beer or other liquid, a conduit section composed of glass, serving as a sight-tube and adapted to be interposed in a conduit, and opposing electrodes having transversely ribbed faces supported within and substantially midway the length of said conduit-section with their adjacent ribbed faces substantially parallel leaving a central narrow sinuous space between them for the passage of the liquid, as set forth.

In witness whereof we have hereunto signed our names in the presence of two witnesses.

LOUIS WAGNER.
JOHN MARR.

Witnesses:
CHAS. W. PARKER,
JNO. S. BARKER.